(12) United States Patent
Nagao

(10) Patent No.: US 11,474,036 B2
(45) Date of Patent: Oct. 18, 2022

(54) FLOCCULATION STATE MONITORING SENSOR

(71) Applicant: KURITA WATER INDUSTRIES LTD., Tokyo (JP)

(72) Inventor: Nobuaki Nagao, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 17/053,356

(22) PCT Filed: Aug. 9, 2019

(86) PCT No.: PCT/JP2019/031659
§ 371 (c)(1),
(2) Date: Nov. 6, 2020

(87) PCT Pub. No.: WO2020/059366
PCT Pub. Date: Mar. 26, 2020

(65) Prior Publication Data
US 2021/0262933 A1  Aug. 26, 2021

(30) Foreign Application Priority Data
Sep. 20, 2018 (JP) .............................. JP2018-176276

(51) Int. Cl.
*G01N 21/53* (2006.01)
*G01N 15/06* (2006.01)
*G01N 21/51* (2006.01)

(52) U.S. Cl.
CPC .......... *G01N 21/532* (2013.01); *G01N 15/06* (2013.01); *G01N 21/51* (2013.01); *G01N 2015/0693* (2013.01); *G01N 2021/513* (2013.01)

(58) Field of Classification Search
CPC ................... G01N 15/06; G01N 21/49; G01N 2015/0693; B01D 21/01; C02F 1/52; B03D 3/06
See application file for complete search history.

(56) References Cited

U.S. PATENT DOCUMENTS 2,887,736 A * 5/1959 Barrett ...................... B60S 1/48
239/113
3,519,356 A * 7/1970 Kroeger ................. G01F 1/661
356/28

(Continued)

FOREIGN PATENT DOCUMENTS

| CN | 102213676 | 10/2011 |
| JP | H06281565 | 10/1994 |

(Continued)

OTHER PUBLICATIONS

Wikipedia Solenoid Valve article on Wayback archive from Jan. 3, 2017: https://web.archive.org/web/20170103074957/https://en.wikipedia.org/wiki/Solenoid_valve.*

(Continued)

*Primary Examiner* — Dominic J Bologna
*Assistant Examiner* — Jarreas C Underwood
(74) *Attorney, Agent, or Firm* — JCIPRNET

(57) ABSTRACT

Provided is a flocculation state monitoring sensor with which blockage of an ejecting part which ejects a gas towards a light emitting part and a light receiving part can be prevented, and which performs stable monitoring. A flocculation state monitoring sensor comprising: a light emitting part which irradiates laser light towards a measuring region which measures a flocculation state; and a light receiving part which receives light scattered along a direction which intersects with a direction along an optical axis of said light emitting part, wherein the light emitting part and the light receiving part are cleaned by air being ejected (Continued)

from nozzles theretowards. A small amount of air is provided to the nozzles between cleaning periods to purge floc, etc.

9 Claims, 1 Drawing Sheet

(56) References Cited

U.S. PATENT DOCUMENTS

| | | | | |
|---|---|---|---|---|
| 3,979,289 | A * | 9/1976 | Bykowski | B01D 33/11 210/403 |
| 4,627,727 | A * | 12/1986 | Jennings | G01N 21/53 356/338 |
| 4,784,491 | A * | 11/1988 | Penney | G01B 11/00 219/121.84 |
| 5,037,559 | A * | 8/1991 | Schmitt | G05D 21/02 210/709 |
| 5,191,878 | A * | 3/1993 | Iida | A61B 1/00091 600/157 |
| 5,194,921 | A * | 3/1993 | Tambo | G01N 15/0205 356/442 |
| 5,630,795 | A * | 5/1997 | Kuramoto | A61B 1/00137 604/35 |
| 5,910,598 | A * | 6/1999 | Shofner | D03J 1/002 55/467 |
| 6,067,908 | A * | 5/2000 | Schoeps | B05B 15/50 101/483 |
| 2014/0151460 | A1 * | 6/2014 | Noffsinger | B61C 15/10 239/69 |

FOREIGN PATENT DOCUMENTS

| | | |
|---|---|---|
| JP | 3251744 | 1/2002 |
| JP | 2002195947 | 7/2002 |
| JP | 2005274216 | 10/2005 |
| JP | 2005351819 | 12/2005 |
| JP | 2007263856 | 10/2007 |
| JP | 2017037033 | 2/2017 |
| JP | 2018096768 | 6/2018 |
| WO | 2018110043 | 6/2018 |

OTHER PUBLICATIONS

"International Search Report (Form PCT/ISA/210) of PCT/JP2019/031659", dated May 11, 2019, with English translation thereof, pp. 1-4.

"Search Report of Europe Counterpart Application", dated May 13, 2022, p. 1-p. 8.

* cited by examiner

FLOCCULATION STATE MONITORING SENSOR

CROSS-REFERENCE TO RELATED APPLICATION

This application is a 371 application of an international PCT application serial no. PCT/JP2019/031659, filed on Sep. 9, 2019, which claims the priority benefit of Japan application JP2018-176276, filed on Sep. 20, 2018. The entirety of the above-mentioned patent application is hereby incorporated by reference herein and made a part of this specification.

TECHNICAL FIELD

The present invention relates to a flocculation state monitoring sensor configured to measure a flocculation state in a flocculation processing liquid, and more particular, to a flocculation state monitoring sensor configured to measure a flocculation state by radiating light into water and receiving scattered light.

BACKGROUND ART

Patent Literature 1 discloses a flocculation state monitoring sensor configured to measure a flocculation state by emitting laser light toward water and receiving scattered light scattered by a floc or the like in the water.

Since the flocculation state monitoring sensor uses light such as laser or LED in detection, it is important to secure an optical path of the light, and for this reason, cleaning is intermittently needed to remove SS elements adhered to a light emitting part or a light receiving part.

In order to perform the cleaning, air is ejected from an ejecting part toward the light emitting part and the light receiving part at a preset timing to clean the light emitting part and the light receiving part.

However, since a detecting part (a probe) of the flocculation state monitoring sensor is always submerged under water, the water enters the ejecting part upon no supply of air to the ejecting part, and a floc or the like is generated to close the ejecting part.

That is, since the SS elements and added flocculant are contained in the water entering the ejecting part, flocculated particles are generated according to a flocculation reaction while staying in the ejecting part. The flocculated particles remain in the ejecting part, an amount of the flocculated particles is increased as time elapses, the flocculated particles are coagulated or fixed in the ejecting part, and thus, an ejecting amount of the air from the ejecting part is gradually reduced as long as the flocculated particles are not discharged from the ejecting part during cleaning (during ejection of air). Accordingly, cleaning of the light emitting part and the light receiving part is insufficient.

In order to discharge the flocculated particles from the ejecting part, when an air ejecting pressure is increased during cleaning, the ejected air or gas-liquid mixed phase flow strongly abuts the light emitting part or the light receiving part, and the light emitting part or the light receiving part may be damaged. While measures such as an increase in ejecting time of the air, an increase in cleaning frequency, and the like, are considered, in this case, a measuring time by the flocculation state monitoring sensor is reduced to that extent.

CITATION LIST

Patent Literature

[Patent Literature 1]
Japanese Patent Laid-Open No. 2002-195947

SUMMARY OF INVENTION

Technical Problem

An objective of the present invention is directed to providing a flocculation state monitoring sensor capable of preventing an ejecting part configured to eject a gas toward a light emitting part and a light receiving part from being blocked and allowing stable monitoring to be performed.

Solution to Problem

A flocculation state monitoring sensor of the present invention includes a light emitting part configured to radiate light toward a measuring region in which a flocculation state is measured; a light receiving part configured to receive light scattered in a direction crossing an optical axis direction of the light emitting part; a nozzle for cleaning the light emitting part configured to eject a gas toward the light emitting part; a nozzle for cleaning the light receiving part configured to eject a gas toward the light receiving part; and a control means configured to control ejection of the gas from each of the nozzles, wherein the control means performs control to execute a cleaning period in which the gas is ejected toward the light emitting part from the nozzle for cleaning the light emitting part or the gas is ejected toward the light receiving part from the nozzle for cleaning the light receiving part, and a purging period in which a gas is discharged at a lower flow speed than in the cleaning period from the nozzle during a time between cleaning periods.

In the aspect of the present invention, the nozzles supply gases through the electromagnetic valves, respectively, and an interval of the purging periods with respect to a cleaning interval of the cleaning periods is 5 to 20%.

Advantageous Effects of Invention

A flocculation state monitoring sensor of the present invention supplies a small amount of air to an ejecting part and purges (discharges) water or floc in the ejecting part during cleaning periods of ejecting a gas from the ejecting part and cleans a light emitting part and a light receiving part. Accordingly, generation and growth of flocculated particles in the ejecting part can be prevented, and the light emitting part and the light receiving part can be sufficiently cleaned during the cleaning periods.

An air supply time to the ejecting part during purging is reduced, and discharged air or the like from the ejecting part does not strongly abut the light emitting part and the light receiving part. In addition, since the purging period is short, a measuring period of the flocculation state monitoring sensor is not reduced very much.

DESCRIPTION OF EMBODIMENTS

Figure 1A:
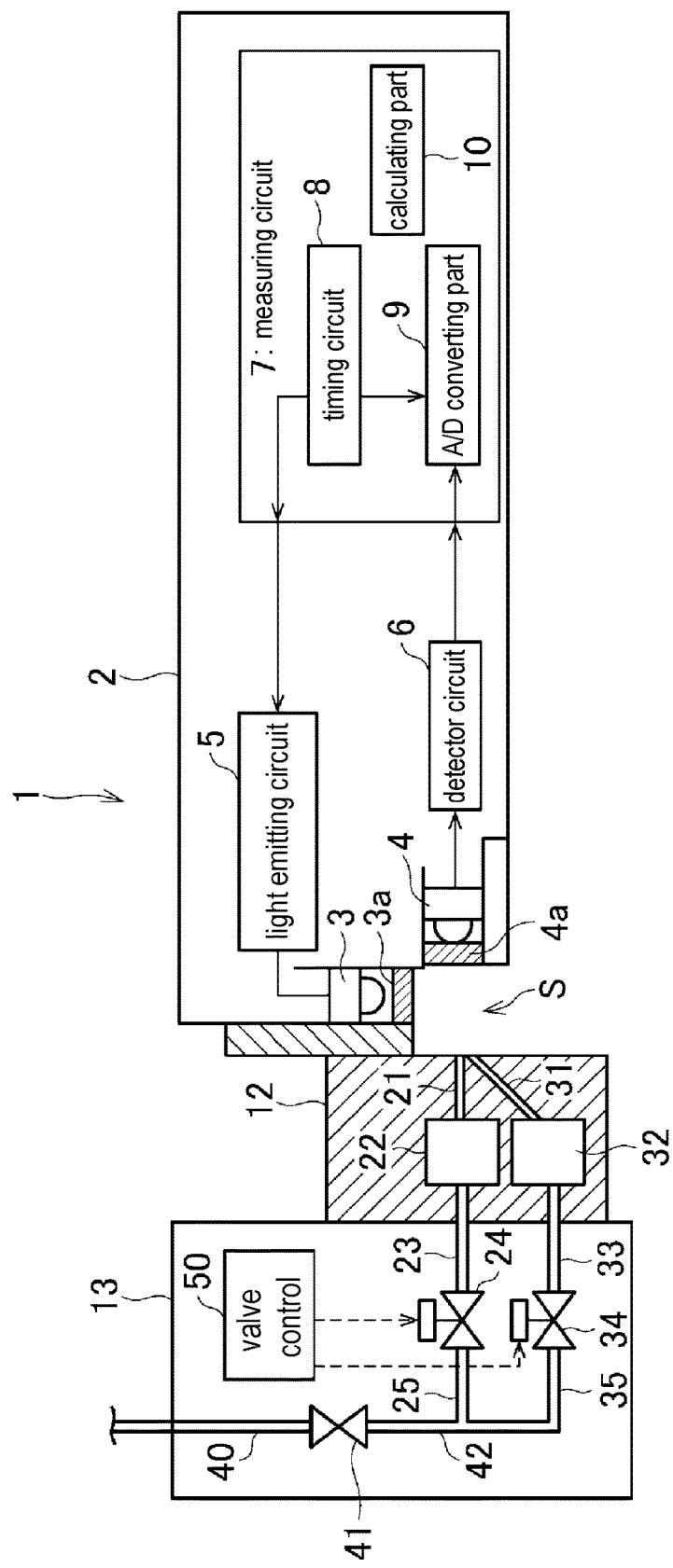
FIG. 1a is a schematic cross-sectional view showing a configuration of a flocculation state monitoring sensor according to an embodiment.
Figure 1B:
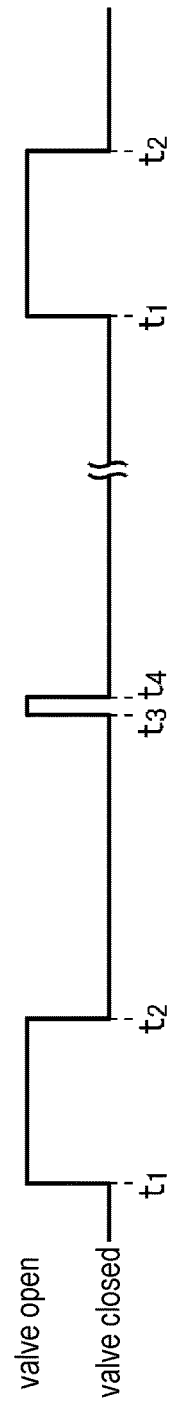
FIG. 1b is a timing chart showing an operation thereof.

Hereinafter, an embodiment will be described with reference to FIGS. 1a and 1b.

A probe 1 that constitutes a flocculation state monitoring sensor has a light emitting part 3 disposed on a tip side of a casing 2 and configured to radiate laser light toward a measuring region S of a flocculation processing liquid (a liquid to which flocculant is added and which is stirred according to necessity). In addition, a light receiving part 4 using a light receiving optical axis in a direction perpendicular to a light receiving optical axis of the light emitting part 3 is provided to face the measuring region S. Transparent plates 3a and 4a are provided on front surfaces of the light emitting part 3 and the light receiving part 4, respectively, and circumferential edge portions of the transparent plates 3a and 4a are sealed water-tightly.

A light emitting circuit 5, a detector circuit 6 and a measuring circuit 7 are provided in the probe 1. The measuring circuit 7 has a timing circuit 8, an A/D converting part 9, a calculating part 10, and the like.

Like Patent Literature 1, laser light radiated from the light emitting part 3 to the measuring region S is scattered by particles in the measuring region S, the scattered light is received by the light receiving part 4, and a flocculation state is measured on the basis of intensity of the received light.

The light emitting circuit 5 transmits an electrical signal having a fixed modulation frequency to the light emitting part according to a signal from the timing circuit and performs laser emission. The light emitting part 3 emits a laser according to a signal from the light emitting circuit 5. The light receiving part 4 receives scattered light generated due to abutting of the laser light with suspended matter in water and converts the scattered light into an electrical signal. The detector circuit 6 removes a modulated element from the electrical signal from the light receiving part 4 and outputs a light receiving voltage according to intensity of the scattered light.

The measuring circuit 7 transmits a signal for emission (a specified frequency modulation wave) to the light emitting circuit 5, converts the signal from the detector circuit 6 into a digital signal, and outputs information related to flocculation through logical operation.

A nozzle housing 12 and a nozzle housing 13 are attached to a tip portion of the probe 1. The nozzle housing 12 is disposed at a side opposite to the light receiving part 4 with the measuring region S sandwiched therebetween. A nozzle 31 configured to eject bubbles toward the transparent plate 3a of the light emitting part 3 and clean the transparent plate 3a using a gas-liquid mixed flow and a nozzle 21 configured to eject bubbles toward the transparent plate 4a of the light receiving part 4 and clean the transparent plate 4a using a gas-liquid mixed flow are provided in the nozzle housing 12.

The nozzles 21 and 31 are continuous with an air supply pipeline 42 via chambers 22 and 32, pipelines 23 and 33, electromagnetic valves 24 and 34, and pipelines 25 and 35. The air supply pipeline 42 is continuous with a compressed air supply source such as a compressor (not shown) or the like via a safety valve 41 and a flexible hose 40.

The electromagnetic valves 24 and 34 are controlled by a valve control circuit 50. Further, the valve control circuit 50 may be mounted on the same circuit board as the measuring circuit 7.

Opening and closing control of the electromagnetic valve 24 will be described with reference to FIG. 1b.

The electromagnetic valve 24 is opened during time $t_1$ to $t_2$ (a cleaning period), and the transparent plate 4a of the light receiving part 4 is cleaned by a gas-liquid mixed flow. After the electromagnetic valve 24 is closed at the time $t_2$, the electromagnetic valve 24 is opened for a short time during time $t_3$ to $t_4$ (a purging period), and the water entering the chamber 22 and the nozzle 21 (containing SS) is extruded and purged to the measuring region S.

Time between the time $t_1$ to $t_2$ is preferably 2 to 10 seconds normally, and in particular, 3 to 5 seconds. The cleaning period (cleaning between time $t_1$ to $t_2$) is preferably performed at a frequency of one time per about 5 to 60 minutes, and in particular, one time per about 10 to 20 minutes.

A time of the purging period of the time $t_3$ to $t_4$ is preferably about 6 to 50 milliseconds, and in particular, about 8 to 15 milliseconds. The purging period is preferably performed at a frequency of one time per about 0.5 to 5 minutes, and in particular, one time per 1 to 2 minutes.

Opening and closing of the electromagnetic valve 34 is also preferably performed in the same manner as described above.

A timing of opening the electromagnetic valve 34 and cleaning the transparent plate 3a of the light emitting part may not overlap a cleaning timing of the transparent plate 4a. The purging period of the nozzle 21 and the chamber 22 and the purging period of the nozzle 31 and the chamber 32 may overlap each other or may be deviated from each other.

As described above, after the air is ejected during the time $t_1$ to $t_2$, when the electromagnetic valve 24 or 34 is closed, water gradually intrudes into the nozzle 21 or 31, or further, the chambers 22 and 32, as time elapses. Then, the flocculated particles (floc) are formed in the nozzles 21 and 31 or in the chambers 22 and 32 by SS elements in the water that have intruded as they are and dissolved medicals (flocculant). When the floc grows until a diameter of the floc is larger than a diameter of the nozzles 21 and 31, a compressed air ejecting resistance upon cleaning is increased.

In the embodiment, since the remaining water or floc in the nozzles 21 and 31 and the chamber 22 and 32 are purged to the region S by performing the purging period between the cleaning periods, an increase in air ejecting resistance from the nozzles 21 and 31 is prevented, and stable measurement (monitoring) can be performed throughout a long period. In addition, since the purging period is short and a frequency thereof is also small, the monitoring is sufficiently performed. In addition, since the purging period is short, a fluid speed flowing from the nozzles 21 and 31 is reduced during the purging period, there is no or little ejected fluid that abuts the plates 3a and 4a, and thus, the plates 3a and 4a are not damaged or abraded.

In the embodiment, while a purge operation is realized during a short "opening" time of the electromagnetic valve, the purge operation may be realized by a method of providing a resistance material in an air flow path for cleaning, adding a pressure flow path for separate cleaning, or the like. Moreover, in these methods, since it is predicted that the structure is complicated or manufacturing cost is increased in comparison with the present invention, it is clear that the present invention is superior to these methods.

The embodiment is an example of the present invention, and the present invention may have configurations other than the above-mentioned.

While the present invention has been described in detail using the specified aspect, it will be apparent to those skilled in the art that various modifications may be made without departing from the spirit of the present invention.

Priority is claimed on Japanese Patent Application No. 2018-176276, filed Sep. 20, 2018, the content of which is incorporated herein by reference.

REFERENCE SIGNS LIST

1 Probe
2 Casing
3 Light emitting part
3a, 4a Transparent plate
4 Light receiving part
21, 31 Nozzle
24, 34 Electromagnetic valve

The invention claimed is:

1. A flocculation state monitoring sensor comprising:
a light emitting part configured to radiate light toward a measuring region in which a flocculation state is measured;
a light receiving part configured to receive light scattered in a direction crossing an optical axis direction of the light emitting part;
a nozzle for cleaning the light emitting part configured to eject a gas toward the light emitting part;
a nozzle for cleaning the light receiving part configured to eject a gas toward the light receiving part; and
a control means configured to control ejection of the gas from each of the nozzles,
wherein the control means performs control to execute a cleaning period in which the gas is ejected toward the light emitting part from the nozzle for cleaning the light emitting part or the gas is ejected toward the light receiving part from the nozzle for cleaning the light receiving part, and
a purging period in which a gas is discharged at a lower flow speed than in the cleaning period from the nozzle during a time between cleaning periods for purging water or floc in the nozzle, wherein a time of the purging period is 6 to 50 milliseconds.

2. The flocculation state monitoring sensor according to claim 1, wherein the nozzles supply gases through electromagnetic valves, respectively.

3. The flocculation state monitoring sensor according to claim 2, wherein chambers are provided between the nozzles and the electromagnetic valves, respectively.

4. The flocculation state monitoring sensor according to claim 3, wherein a time of the cleaning period is 2 to 10 seconds.

5. The flocculation state monitoring sensor according to claim 4, wherein the cleaning period is performed at a frequency of one time per 5 to 60 minutes, and the purging period is performed at a frequency of one time per 0.5 to 5 minutes.

6. The flocculation state monitoring sensor according to claim 2, wherein a time of the cleaning period is 2 to 10 seconds.

7. The flocculation state monitoring sensor according to claim 6, wherein the cleaning period is performed at a frequency of one time per 5 to 60 minutes, and the purging period is performed at a frequency of one time per 0.5 to 5 minutes.

8. The flocculation state monitoring sensor according to claim 1, wherein a time of the cleaning period is 2 to 10 seconds.

9. The flocculation state monitoring sensor according to claim 8, wherein the cleaning period is performed at a frequency of one time per 5 to 60 minutes, and the purging period is performed at a frequency of one time per 0.5 to 5 minutes.

* * * * *